No. 865,822. PATENTED SEPT. 10, 1907.
L. E. BOGEN.
METHOD OF AND MEANS FOR CONTROLLING ELECTRIC MOTORS.
APPLICATION FILED MAY 27, 1907.
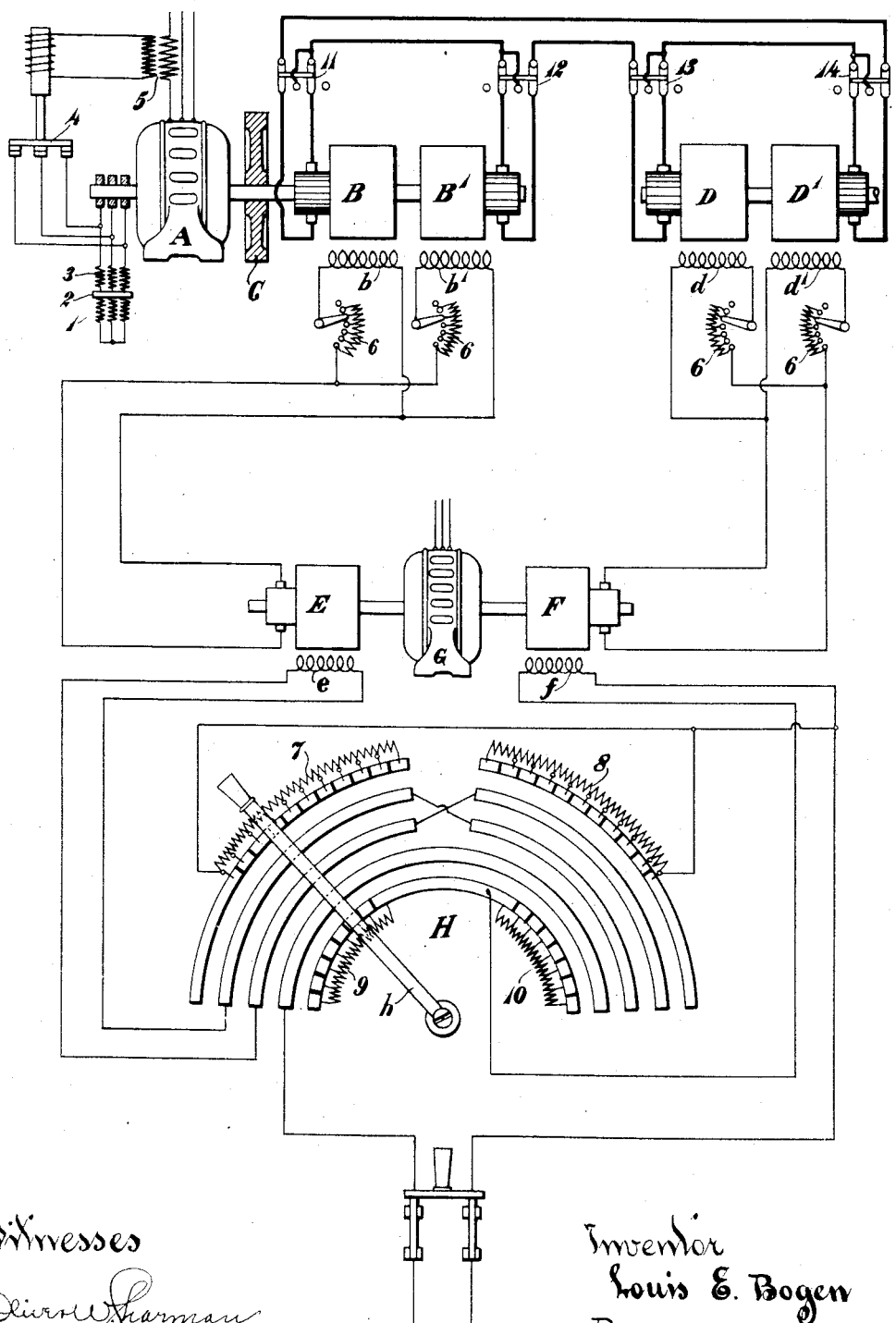

UNITED STATES PATENT OFFICE.

LOUIS E. BOGEN, OF CINCINNATI, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

METHOD OF AND MEANS FOR CONTROLLING ELECTRIC MOTORS.

No. 865,822.   Specification of Letters Patent.   Patented Sept. 10, 1907.

Application filed May 27, 1907. Serial No. 375,815.

*To all whom it may concern:*

Be it known that I, LOUIS E BOGEN, a citizen of the United States, residing at Cincinnati, in the county of Hamilton and State of Ohio, have invented certain new and useful Improvements in Methods of and Means for Controlling Electric Motors, of which the following is a full, clear, and exact specification.

My invention relates to motor control systems.

In rolling mills and in hoisting machinery, it is necessary that the moving parts be quickly and often changed in speed and direction. It has been proposed to control electric motors for doing this work by supplying their armatures from special generators and varying and reversing the field strength of said generators to control the speed and direction of the motors. It has also been proposed in addition to the above to vary the motor field strength to assist in the speed control of the motor. But as the size of the units is increased the field currents become so great that control by the use of rheostats directly in the field circuits of the generator and the motor becomes impracticable It is the object of my present invention to provide a system in which the controlling rheostats are not required to make or break the armature or field currents of the working motor or of the generator supplying the armature thereof. This result is obtained by supplying the field windings of the working motor and of the generator supplying the armature of the motor from separate sources of electromotive force, and varying the electromotive forces of said separate sources. These separate sources are preferably dynamo-electric machines driven in any desired manner and arranged to have their field strengths varied inversely.

The novel features of my invention will appear from the description and drawings and will be particularly pointed out in the claims.

The single figure of the drawing shows diagrammatically one embodiment of my invention.

In this figure A is an electric motor of the three-phase induction type, though obviously other forms of motors may be used instead. In the rotor circuit of this motor is a starting resistance 1 adjustable by means of short-circuiting bar 2, and a regulating resistance 3 arranged to be cut in and out by a solenoid switch 4, which in turn is responsive to the current strength in the primary of the motor A, as through a series-transformer 5. Two generator armatures B and B' are driven by the motor A, being preferably directly connected thereto, and on the common shaft of the motor A and the generators B and B' is a heavy fly-wheel C. The armatures D and D' of the two working motors are mounted on a common shaft, and are connected in series and supplied from the armatures B and B', which are also connected in series. Two generators and two motors are used merely to diminish the size thereof, for if only one of each were used it would have to be excessively large. In the smaller plants, and if desired in the larger ones, one generator and one motor only may be used if desired. The working motors may be used to drive any desired machinery.

Two auxiliary generators or exciters E and F are driven by any suitable source of power, preferably by a three-phase induction motor G, which may be started and controlled in any desired manner. The exciter E supplies the field windings $b$ and $b'$ of the two main generators, while the exciter F supplies the field windings $d$ and $d'$ of the two working motors. In the respective circuits of the field windings $b$, $b'$, $d$ and $d'$ are rheostats 6, by means of which the relative current strengths taken by the different main field windings may be adjusted and any one of the field windings disconnected. A controller H is arranged to control resistances in the circuits of the field windings $e$ and $f$ of the exciters, and to reverse the current in the field winding $e$. The field windings $e$ and $f$ may be supplied from any desired source of current, which may be entirely separate and distinct as here shown or may be the exciter armature F.

The operation of the system is as follows:—The primary circuit of motor A is closed and the motor accelerated by cutting out the starting resistance 1 by the bar 2. The switch 4 is held open by its solenoid at this time because of the heavy current required for starting the motor. If desired other means may be used to insure the open condition of this switch during starting. After all the starting resistance 1 has been cut out and the motor has gained sufficient speed, the solenoid switch 4 is allowed to close to cut out resistance 3 because of the decrease in the primary current of motor A. The fly-wheel C and the generator armatures B and B' are also started with the motor A, and the fly-wheel stores mechanical energy by its rotation. During this starting the arm $h$ of the controller is preferably in its vertical or "off" position. The motor G and generators E and F are started in any desired manner. The exciter field $f$ and consequently the motor fields $d$ and $d'$ are now at their strongest, while the exciter field $e$ and consequently the generator fields $b$ and $b'$ are deënergized. The arm $h$ is now moved from the vertical toward the horizontal in the proper direction to give the motors D and D' the desired direction of rotation. As this arm moves, say counter-clockwise, it first completes the circuit of the field coil $e$ through the whole resistance 7 and then gradually cuts said resistance out of circuit. The fields $b$ and $b'$ vary in strength in the same proportion as the field $e$, and the electromotive force supplied by the armatures B and B' is raised from zero toward a maximum. This causes the motors D and D' to start and increase in speed, the field strength of these motors being at a maximum to give a strong starting torque. After a part of the resistance 7 has been cut out further movement of the arm $h$, besides cutting out the remainder of said resistance, also begins to cut the resistance 9 into the circuit of the field winding $f$ to decrease the electromotive force of the exciter F and the field strength of the working motors to assist in increasing the speed of the latter. In this part of the movement of the arm $h$ the resistances 7 and 9 are varied simultaneously and inversely until the field $e$ and consequently the electromotive force of the main generators have been brought to a maximum. In the continued movement of the arm $h$ the field $e$ and the electromotive force of the main generators are maintained constant, while the remainder of the resistance 9 is gradually cut into the circuit of the field winding $f$ to further increase the speed of the working motors. The speed which the motors D and D' acquire depends upon the extent of movement of the arm $h$, the full speed being reached when said arm is in its horizontal position.
If the load is heavy the working motors require more power than the motor A can furnish, and the current rising in the primary of the transformer 5 by reason of this heavy load the switch 4 is opened, thus inserting the resistance 3 in the rotor circuit of the motor A.
The slip of this motor is therefore increased and the motor is permitted to slow down slightly, thus allowing the fly-wheel C to give up some of the mechanical energy it has stored to help drive the generators B and B' to supply electrical energy at the rate demanded by the motors D and D' to drive their load.

As the arm $h$ is moved back toward the vertical the field $f$ and consequently the fields $d$ and $d'$, and the strength of the field $e$ and consequently the electromotive force of the generators B and B', are varied in a manner exactly the reverse of that above described. This slows down the motors D and D' by causing them to act as generators to help supply current to the armatures B and B', which now serve as motor armatures to help supply energy to the fly-wheel C. There is a powerful braking effect on the working motors due to their acting as generators. When because of the diminished load the current in the primary of the transformer 5 decreases, the solenoid switch 4 is caused to close, thereby cutting out the resistance 3 and increasing the speed of the motor A. This causes the latter to supply or help supply energy to the fly-wheel C and to drive the armatures B and B' when they are running as generator armatures. When the arm $h$ is moved on the other side of the vertical the above cycle is repeated, save that the resistances 8 and 10 are varied instead of the resistances 7 and 9, the current in the field winding $e$ is reversed, and the motors D and D' rotate in the other direction.

Switches 11, 12, 13 and 14 may be provided for cutting out the machines B, B', D and D' respectively, when desirable, as in case one of the machines becomes grounded. Any suitable method of connecting or combining these switches may be used, that shown being merely illustrative.
The term "inversely" in this description and in the claims is intended not to be limited to exact "inverse proportion" but to include any decrease in one and increase in the other of the two things specified.

The term "simultaneously" as used in this description and in the claims is intended not to be limited to exact simultaneity in the individual parts of the operations referred to.

Although my invention has been described with some particularity in what is now considered to be its preferred form, it is obvious that many modifications may be made in the precise arrangements shown and described without departing from the spirit and scope of my invention. All such I aim to cover in the following claims.

What I claim as new is:—

1. The method of controlling an electric motor, which consists in supplying its armature from a dynamo-electric generator, supplying its field winding and the field winding of said generator from two electrically independent sources of electromotive force respectively, and varying the electromotive forces of said sources.

2. The method of controlling an electric motor, which consists in supplying its armature from a dynamo-electric generator, supplying its field winding and the field winding of said generator from two independent sources of electromotive force respectively, and varying the electromotive forces of said sources inversely.

3. The method of controlling an electric motor, which consists in supplying its armature from a dynamo-electric generator, supplying its field winding and the field winding of said generator from two sources of electromotive force respectively, and varying the electromotive forces of said sources successively.

4. The method of controlling an electric motor, which consists in supplying its armature from a dynamo-electric generator, supplying its field winding and the field winding of said generator from two sources of electromotive force respectively, and varying the electromotive forces of said sources successively and inversely.

5. The method of controlling an electric motor, which consists in supplying its armature from a dynamo-electric generator, supplying its field winding and the field winding of said generator from two electrically independent sources of electromotive force respectively, and varying the electromotive forces of said sources simultaneously.

6. The method of controlling an electric motor, which consists in supplying its armature from a dynamo-electric generator, supplying its field winding and the field winding of said generator from two independent sources of electromotive force respectively, and varying the electromotive forces of said sources simultaneously and inversely.

7. The method of controlling an electric motor, which consists in supplying its armature from a dynamo-electric generator, supplying its field winding and the field winding of said generator from two electrically independent sources of electromotive force respectively, varying the electromotive forces of said sources, and reversing the direction of the electromotive force of one of said sources.

8. The method of controlling an electric motor, which consists in supplying its armature from a dynamo-electric generator, supplying its field winding and the field winding of said generator from two sources of electromotive force respectively, varying the electromotive forces of said sources, and reversing the direction of the electromotive force of that source from which the field of the generator is energized.

9. The method of controlling an electric motor, which consists in supplying its armature from a dynamo-electric generator, supplying its field winding and the field winding of said generator from two sources of electromotive force respectively, varying the electromotive forces of said sources, and storing energy when the load is light and using said stored energy to help drive the generator when the load is heavy.

10. The method of controlling an electric motor, which consists in supplying its armature from a dynamo-electric generator, supplying its field winding and the field winding of said generator from two sources of electromotive force respectively, varying the electromotive forces of said sources, storing energy when the load is light and using said stored energy to help drive the generator when the load is heavy, and varying the speed of the generator in an inverse sense to the variations in load.

11. A motor control system comprising a motor, a generator supplying the armature of said motor, two independent sources of electromotive force supplying the field windings of said generator and said motor respectively, and means for varying the electromotive forces of said two sources.

12. A motor control system comprising a motor, a generator supplying the armature of said motor, two electrically independent sources of electromotive force supplying the field windings of said generator and said motor respectively, and means for varying the electromotive forces of said two sources inversely.

13. A motor control system comprising a motor, a generator supplying the armature of said motor, two sources of electromotive force supplying the field windings of said generator and said motor respectively, and means for varying the electromotive forces of said two sources successively.

14. A motor control system comprising a motor, a generator supplying the armature of said motor, two sources of electromotive force supplying the field windings of said generator and said motor respectively, and means for varying the electromotive forces of said two sources successively and inversely.

15. A motor control system comprising a motor, a generator supplying the armature of said motor, two independent sources of electromotive force supplying the field windings of said generator and said motor respectively, and means for varying the electromotive forces of said two sources simultaneously.

16. A motor control system comprising a motor, a generator supplying the armature of said motor, two electrically independent sources of electromotive force supplying the field windings of said generator and said motor respectively, and means for varying the electromotive forces of said two sources simultaneously and inversely.

17. A motor control system comprising a motor, a generator supplying the armature of said motor, two independent sources of electromotive force supplying the field windings of said generator and said motor respectively, and means for varying the electromotive forces of said two sources and for reversing the electromotive force of one of said sources.

18. A motor control system comprising a motor, a generator supplying the armature of said motor, two sources of electromotive force supplying the field windings of said generator and said motor respectively, and means for varying the electromotive forces of said two sources and for reversing the electromotive force of the source from which the generator field is energized.

19. A motor control system comprising a motor, a generator supplying the armature of said motor, two sources of electromotive force supplying the field windings of said generator and said motor respectively, means for varying the electromotive forces of said two sources, and means for storing any excess of supplied energy when the motor load is light and for supplying said stored energy to help drive the generator when the motor load is heavy.

20. A motor control system comprising a motor, a generator supplying the armature of said motor, two sources of electromotive force supplying the field windings of said generator and said motor respectively, means for varying the electromotive forces of said two sources, means for storing energy when the motor load is light and for supplying said stored energy to help drive the generator when the motor load is heavy, and means for varying the speed of the generator in an inverse sense to the variation in the motor load.

21. A motor control system comprising a motor, a generator supplying the armature of said motor, two exciters excited independently of said generator and supplying the field windings of said generator and said motor respectively, and means for varying the field strengths of said exciters.

22. A motor control system comprising a motor, a generator supplying the armature of said motor, two exciters excited independently of said generator and supplying the field windings of said generator and said motor respectively, and means for varying the field strengths of said exciters inversely.

23. A motor control system comprising a motor, a generator supplying the armature of said motor, two exciters supplying the field windings of said generator and said motor respectively, and means for varying the field strenghs of said exciters successively.

24. A motor control system comprising a motor, a generator supplying the armature of said motor, two exciters supplying the field windings of said generator and said motor respectively, and means for varying the field strengths of said exciters successively and inversely.

25. A motor control system comprising a motor, a generator supplying the armature of said motor, two exciters excited independently of said generator and supplying the field windings of said generator and said motor respectively, and means for varying the field strengths of said exciters simultaneously.

26. A motor control system comprising a motor, a generator supplying the armature of said motor, two exciters excited independently of said generator and supplying the field windings of said generator and said motor respectively, and means for varying the field strengths of said exciters simultaneously and inversely.

27. A motor control system comprising a motor, a generator supplying the armature of said motor, two exciters excited independently of said generator and supplying the field windings of said generator and said motor respectively, and means for varying the field strengths of said exciters and for reversing the field of one of them.

28. A motor control system comprising a motor, a generator supplying the armature of said motor, two exciters supplying the field windings of said generator and said motor respectively, and means for varying the field strengths of said exciters and for reversing the field of the exciter from which the generator field is energized.

29. A motor control system comprising a motor, a generator supplying the armature of said motor, two exciters supplying the field windings of said generator and said motor respectively, means for varying the field strengths of said exciters, and a fly-wheel mechanically connected to the generator.

30. A motor control system comprising a motor, a generator supplying the armature of said motor, two exciters supplying the field windings of said generator and said motor respectively, means for varying the field strengths of said exciters, a fly-wheel mechanically connected to the generator, and means for varying the speed of said generators in an inverse sense to the variation in the load on the motors.

31. A motor control system comprising a plurality of motors connected to a common load, a common source of electromotive force supplying the armatures of said motors, a common source of electromotive force supplying the field magnets of said motors, and means for varying the relative current strengths in the field windings of said motors.

32. A motor control system comprising a plurality of motors connected to a common load, a common source of electromotive force supplying the armatures of said motors, a common source of electromotive force supplying the field windings of said motors, and means for varying the field strengths of said motors both individually and collectively.

33. A motor control system comprising a motor, a plurality of generators supplying the armature of said motor, a common source of electromotive force supplying the field windings of said generators, and means for varying the relative current strengths in the field windings of said generators.

34. A system of motor control comprising a motor, a plurality of generators supplying the armature of said motor, a common source of electromotive force supplying the field windings of said generators, and means for varying the field strengths of said generators both individually and collectively.

35. A motor control system comprising a plurality of motors connected to a common load, a plurality of generators supplying the armatures of said motors, a common source of electromotive force supplying the field windings of the motors, a common source of electromotive force supplying the field windings of the generators, means for varying the relative current strengths in the motor field windings, and means for varying the relative current strengths in the generator field windings.

36. A motor control system comprising a plurality of motors connected to a common load, a plurality of generators supplying the armatures of said motors, a common source of electromotive force supplying the field windings of the motors, a common source of electromotive force supplying the field windings of the generators, means for varying the field strengths of the motors both individually and collectively, and means for varying the field strengths of the generator both individually and collectively.

37. In combination, a plurality of electric generators whose armatures are normally connected in series, a plurality of electric motors whose armatures are normally connected in series and supplied by said generators, and means for cutting out any of said generators.

38. In combination, a plurality of electric generators whose armatures are normally connected in series, a plurality of electric motors whose armatures are normally connected in series and supplied by said generators, and means for cutting out any of said motors.

39. In combination, a plurality of electric generators whose armatures are normally connected in series, a plurality of electric motors whose armatures are normally connected in series and supplied by said generators, and means for cutting out any of said generators or motors.

40. The method of controlling an electric motor, which consists in supplying its armature and its field windings from separate sources of electromotive force, and varying the electromotive forces of said sources successively and inversely.

41. The method of controlling an electric motor, which consists in supplying its armature and its field windings from separate sources of electromotive force, varying the electromotive forces of said sources successively and inversely, and reversing the electromotive force of the armature-supplying source.

42. A motor control system comprising an electric motor, separate sources of electromotive force for supplying its armature and its field windings respectively, and means for varying the electromotive forces of said sources successively and inversely.

43. A motor control system comprising an electric motor, separate sources of electromotive force for supplying its armature and its field windings respectively, and means for varying the electromotive forces of said sources successively and inversely and for reversing the electromotive force of said armature-supplying source.

44. The method of controlling an electric motor, which consists in supplying its armature and its field windings from electrically independent sources of electromotive force and varying the electromotive forces of both of said sources.

45. The method of controlling an electric motor, which consists in supplying its armature and its field windings from separate sources of electromotive force, varying the electromotive forces of both of said sources, and reversing the electromotive force of the armature-supplying source.

46. A motor control system comprising an electric motor, separate sources of electromotive force for supplying its armature and its field windings respectively, and means for varying the electromotive forces of both of said sources and for reversing the electromotive force of said armature-supplying source.

In testimony whereof I affix my signature, in the presence of two witnesses.

LOUIS E. BOGEN.

Witnesses:
GEO. B. SCHLEY,
FRED J. KINSEY.